Jan. 4, 1927.
G. C. BARTRAM
1,613,434
PIPE JOINT
Filed Sept. 20, 1922
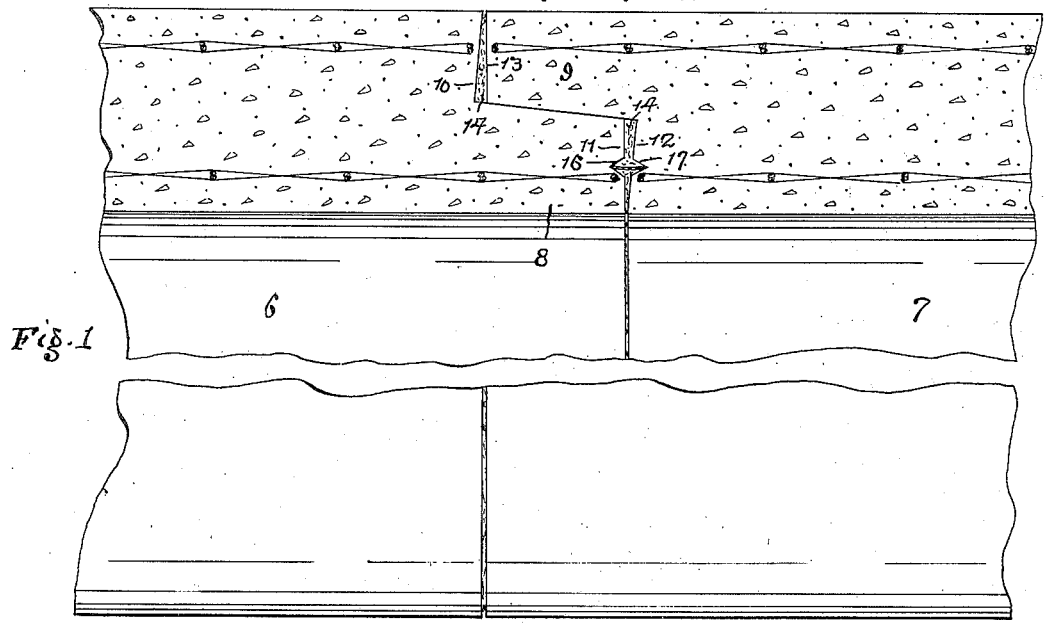
Fig.1
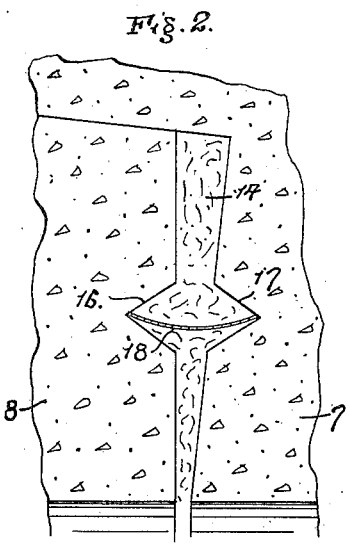
Fig.2.
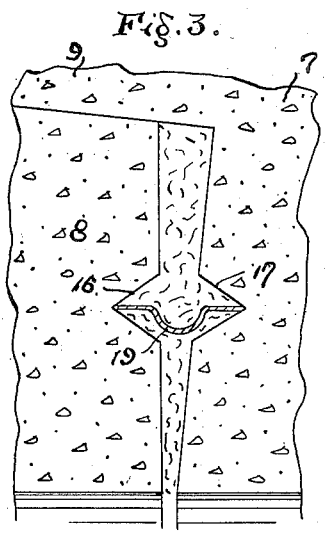
Fig.3.
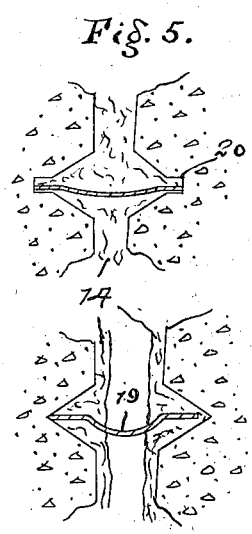
Fig.5.
Fig.4.
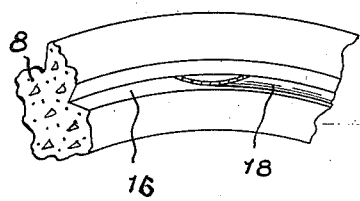
Fig.6.
INVENTOR.
GEORGE C. BARTRAM
BY
ATTORNEYS Patented Jan. 4, 1927.

1,613,434

UNITED STATES PATENT OFFICE.

GEORGE CORRIE BARTRAM, OF FREEPORT, NEW YORK.

PIPE JOINT.

Application filed September 20, 1922. Serial No. 589,350.

My invention relates to pipe joints, and particularly to joints for concrete pipes. The object of my invention is to provide a simple and effective sealing device for the joint between adjacent pipe sections.

In the accompanying drawings—

Fig. 1 is a longitudinal section through portion of a pipe joint in which my invention is illustratively embodied;

Fig. 2 is an enlarged section of portion of the view shown in Fig. 1;

Figs. 3, 4 and 5 are similar views of modifications; and

Fig. 6 is a broken end view of portion of a pipe end.

While my invention may be applied to joints of various character, such as lap joints, butt joints, and bell and spigot joints of different constructions, I have embodied it in a type of joint commonly employed in concrete pipe for pressure lines. In pipe of this character, the sections 6 and 7 are commonly of the same over-all diameter throughout their length, one section, e. g. 6, being peripherally recessed at one end to afford a projecting spigot flange 8, the outer surface of which is preferably coned to make joint with the similarly coned inner face of the bell flange 9 formed at the adjacent end of section 7. The more or less radial faces 10 and 11 of the spigot section approach like faces 12 and 13 respectively of the bell section, and may in some instances engage the latter to form butt joints. Ordinarily, however, these faces are slightly inclined with respect to each other to accommodate sealing material 14 of any suitable character. When pitch, or other suitable plastic sealing material is used, all of the joint surfaces, including the bell and spigot faces, are coated therewith.

The seal to which my invention particularly relates, may be arranged at any suitable point in the joint area. I have shown it between the end of the spigot flange 8 and the opposed body of the bell section 7. As shown in Fig. 1, the opposed faces of the two pipe sections are annularly channelled at 16 and 17 by V-grooves, although the latter may be of any desired appropriate cross-section. Engaged between the seats thus afforded is a spring sealing ring 18 of any suitable material. For most purposes this ring should be of metal, and of non-rusting metal, such as brass. Under certain conditions steel, or even fiber or rubber composition, may be employed to advantage, if the use to which the line is put is such that the ring is not likely to suffer deterioration under operating conditions. In any event, the ring is of spring character, and of such width that when the pipe sections are brought together to make joint, the margins of the ring are engaged between the seats and the ring itself distorted by the longitudinal pressure, so that the margins are forced against their seats with spring pressure.

The cross-sectional contour of the sealing ring may be widely varied. In Figs. 1, 2 and 6, a simple form is shown comprising a transversely bowed ring. The arch of the bow is faced inward so that the pressure exerted against the ring from the interior of the pipe, tends to expand it and thus to force its margins against the seats on which they rest. If the pressure were exerted from the exterior—as might in some instances be the case, for example, in a subaqueous line—the bow would be faced in the opposite direction to secure the same result.

In Figs. 3, 4 and 5, the sealing ring is cylindrical at its opposite margins, and the latter are united by an intermediate bowed area 19 which is faced outward or inward as the circumstances may require.

In Fig. 5 each seat is slightly modified by providing a channel 20 at the bottoms of the V-shaped grooves.

When the pipe sections are about to be assembled, the opposed joint faces are coated or brushed with pitch, or other suitable plastic sealing material, and while still spaced apart, the sealing ring is pressed to its seat on one or the other of the pipe ends (Fig. 4). The ring is restrained in this position by the plastic sealing material, while the sections are being brought to joint-making position. When the joint is made the sealing ring is not only engaged between the two seats, but is distorted—that is to say placed under stress,—so that its margins are spring pressed against the seats. Where the joint is subjected to internal or external pressure, the sealing ring is forced against its seats, not only by its own spring stress, but also by the pressure thus exerted against it, and the sealing effect rendered still more sure. The seal is not broken by any slight separation of the pipe sections which may result from temperature changes, since the spring action of the ring causes it to expand, and thus to maintain its margins in engagement with the seats.

Of course there may be a multiple of such sealing rings, concentrically arranged and located at radially spaced areas of the joint, and such a construction adds to the security of the joint. It does not involve any departure from the underlying thought of the invention, however, which is embodied in the self-contained spring ring, independent of the pipe sections, but engaged under stress between opposed surfaces in the assembled joint, and serving to maintain the joint tight regardless of expansion and contraction.

A second underlying thought is found in the shaping of the ring in such manner that when subjected to pressure either from within or from without the pipe, its margins are expanded into closer engagement with the pipe sections, thus serving the more securely to seal the joint against leakage.

Various modifications will readily occur to those dealing with the problem, which do not depart from what I claim as my invention.

I claim—

1. The method of making a joint between pipe sections, which comprises applying plastic material to one of the joint faces, pressing the margins of a sealing ring into said plastic material to support the ring while the joint is being made, and bringing the pipe sections into joint-making position in which the ring is engaged under stress between the opposed faces of the joint.

2. A joint between concrete pipe sections comprising contact areas on the adjacent pipe ends, and non-contacting surfaces radially spaced therefrom in combination with a spring ring independent of the pipe sections but engaged under stress at its opposite side margins between said non-contacting surfaces to seal the joint.

3. A joint between concrete pipe sections comprising contact areas on the adjacent pipe ends, and non-contacting surfaces radially spaced therefrom, said non-contacting surfaces being annularly channelled in register, in combination with a spring ring independent of the pipe sections but engaged under stress at its opposite side margins at the bottoms of the annular channels in said non-contacting surfaces, and serving to seal the joint.

4. A joint between concrete pipe sections comprising contact areas on the adjacent pipe ends, and non-contacting surfaces radially spaced therefrom, said non-contacting surfaces being annularly channelled in register, plastic sealing material in the channels so formed, in combination with a spring ring independent of the pipe sections but engaged under stress at its opposite side margins at the bottoms of said channels and serving with said plastic material to seal the joint.

In testimony whereof I have signed my name to this specification.

GEORGE CORRIE BARTRAM.